(12) United States Patent
Deguchi et al.

(10) Patent No.: US 6,519,544 B1
(45) Date of Patent: Feb. 11, 2003

(54) METHOD AND APPARATUS FOR IEEE 1394 BUS ANALYSIS

(75) Inventors: Tomohiro Deguchi, Kanagawa (JP); Hiroyuki Miyazaki, Kanagawa (JP); Hiroyuki Yoshida, Kanagawa (JP); Minoru Wano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 09/662,141

(22) Filed: Sep. 14, 2000

(30) Foreign Application Priority Data

Sep. 29, 1999 (JP) .......................... 11-276039
Apr. 28, 2000 (JP) ........................ 2000-134177

(51) Int. Cl.[7] ............................................. G06F 19/00
(52) U.S. Cl. ..................... 702/117; 702/117; 702/122; 702/186; 710/43; 710/52; 710/105; 710/15; 709/200; 709/212; 709/220; 712/220; 712/223; 712/200
(58) Field of Search ................................ 702/108, 116, 702/117, 122, 124, 127, 182, 186, 193; 710/1–28, 36–38, 43, 52, 105, 106, 107, 120, 305, 314, 316, 243, 260, 268; 709/200, 212, 220, 227, 230, 245, 253, 331; 712/220, 223, 200, 201; 386/124, 129, 112

(56) References Cited

U.S. PATENT DOCUMENTS 6,202,103 B1 * 3/2001 Vonbank et al. ............. 710/15

FOREIGN PATENT DOCUMENTS

JP 6-223046 8/1994

OTHER PUBLICATIONS

Kunzman et al., '1394 High Performance Serial Bus: the Digital Interface for ATV', IEEE, vol. 41, Aug. 1995, pp. 893–894.*

* cited by examiner

Primary Examiner—Marc S. Hoff
Assistant Examiner—Elias Desta
(74) Attorney, Agent, or Firm—Armstrong, Westerman & Hattori, LLP

(57) ABSTRACT

IEEE 1394 bus interface circuit 15X comprises a physical layer LSI 37 connected to an IEEE 1394 bus 14, a data capture circuit 22X connected to the physical layer LSI 37 through signal lines to capture data on the signal lines for data analysis, and a coupler (a plug or a socket) 38 to be coupled to a coupler (a socket or a plug) 39 to which a physical layer LSI of an IEEE 1394 bus interface 10 is attached in actual use. With engaging the couplers 39 and 38 to each other, data transmitted between nodes 10 and 13 are captured by the data capture circuit 22X and analyzed in an IEEE 1394 bus analysis apparatus 16. In another IEEE 1394 bus interface circuit, a link power status signal provided to the physical layer circuit from the link layer circuit is fixedly set low, whereby the physical layer circuit is made to function as a repeater, and data received by the physical layer circuit are captured by the link layer circuit and analyzed in the IEEE 1394 bus analysis apparatus.

12 Claims, 14 Drawing Sheets

FIG.9

| '10' | Phy_ID | '0' | L | OTHER SELF-ID INFORMATION (22 BITS) |

METHOD AND APPARATUS FOR IEEE 1394 BUS ANALYSIS

BACKGROUND OF THE INVENTION

1. Field of the Invention

The present invention relates to a method and an apparatus for IEEE 1394 bus analysis used in product development of a 1394 bus interface circuit.

2. Description of the Related Art

A high speed serial bus conforming to the IEEE 1394 standard (hereinafter referred to as 1394 bus) has been adopted between electronic equipment, for example, between a computer and its peripheral devices, in order to transfer data at a high speed through interconnections each having a small number of electrical lines.

For example, as shown in FIG. 13, in order to transfer data between a computer 10 and a digital video camera 11, 1394 bus interface circuits (nodes) 12 and 13 are connected to the computer 10 and the camera 11, respectively, and a 1394 cable 14 is connected therebetween. The circuits 12 and 13 are configured in different ways depending on configurations of respective interface circuits provided to the computer 10 and the camera 11. When developing the 1394 bus interface circuit 13, there is a need to capture and analyze data on the 1394 cable 14.

In the prior art, as shown in FIG. 14, a 1394 bus analysis interface circuit 15 was disposed between the circuits 12 and 13, a 1394 cable 14A was connected between the circuits 13 and 15, while a 1394 cable 14B was connected between the circuits 12 and 15, and a 1394 bus analysis apparatus 16 was connected to the circuit 15, thereby verifying data on the 1394 bus.

However, since the 1394 bus analysis interface circuit 15 is connected between the interface circuits 12 and 13, the analysis is carried out events different from that on a bus in an actual system.

Further, although the maximum number of nodes according to the specifications of the IEEE 1394 standard is 63, there is a system in which the number of nodes is limited to 2, in which case the 1394 bus analysis interface circuit 15 cannot be connected as shown in FIG. 14.

SUMMARY OF THE INVENTION

Accordingly, it is an object of the present invention to provide a method and an apparatus for an IEEE 1394 bus analysis, capable of analyzing an event on a bus between electronic equipment's of a system used actually.

In one aspect of the present invention, there is provided an IEEE 1394 bus analysis method comprising the steps of: preparing an IEEE 1394 bus interface circuit which includes a physical layer circuit connected to an IEEE 1394 bus; and a link layer circuit connected to the physical layer through signal lines in order to transmit to and receive signals from the physical layer, receiving data from the signal lines; storing the received data; and analyzing the stored data.

With this aspect, since a portion receiving signals from the signal lines is not a node of the IEEE 1394 bus, an analysis can be carried out on events on the IEEE bus in the same system as that used actually.

In another aspect of the present invention, there is provided an IEEE 1394 bus analysis interface circuit comprising: a physical layer circuit, connected to an IEEE 1394 bus, having a link power status signal input, the link power status signal input being fixed inactive to function as a repeater; and a data capture circuit, connected to the physical layer circuit through signal lines, capturing data on the signal lines for data analysis.

With this aspect, on a bus reset conforming to the IEEE 1394 standard, a self ID packet including information of link-off (L='0') is outputted from the physical layer circuit onto the 1394 bus, and the physical layer circuit functions as a repeater, thereby an analysis can be carried out on events on the IEEE 1394 bus in the same system as that used actually. Further, a bus analysis can be performed on any system using the IEEE 1394 bus.

Other aspects, objects, and the advantages of the present invention will become apparent from the following detailed description taken in connection with the accompanying drawings.

BRIEF DESCRIPTION OF THE DRAWINGS

FIG. 9 is an illustration of a self-ID format;

DESCRIPTION OF THE PREFERRED EMBODIMENTS

Figure 1:
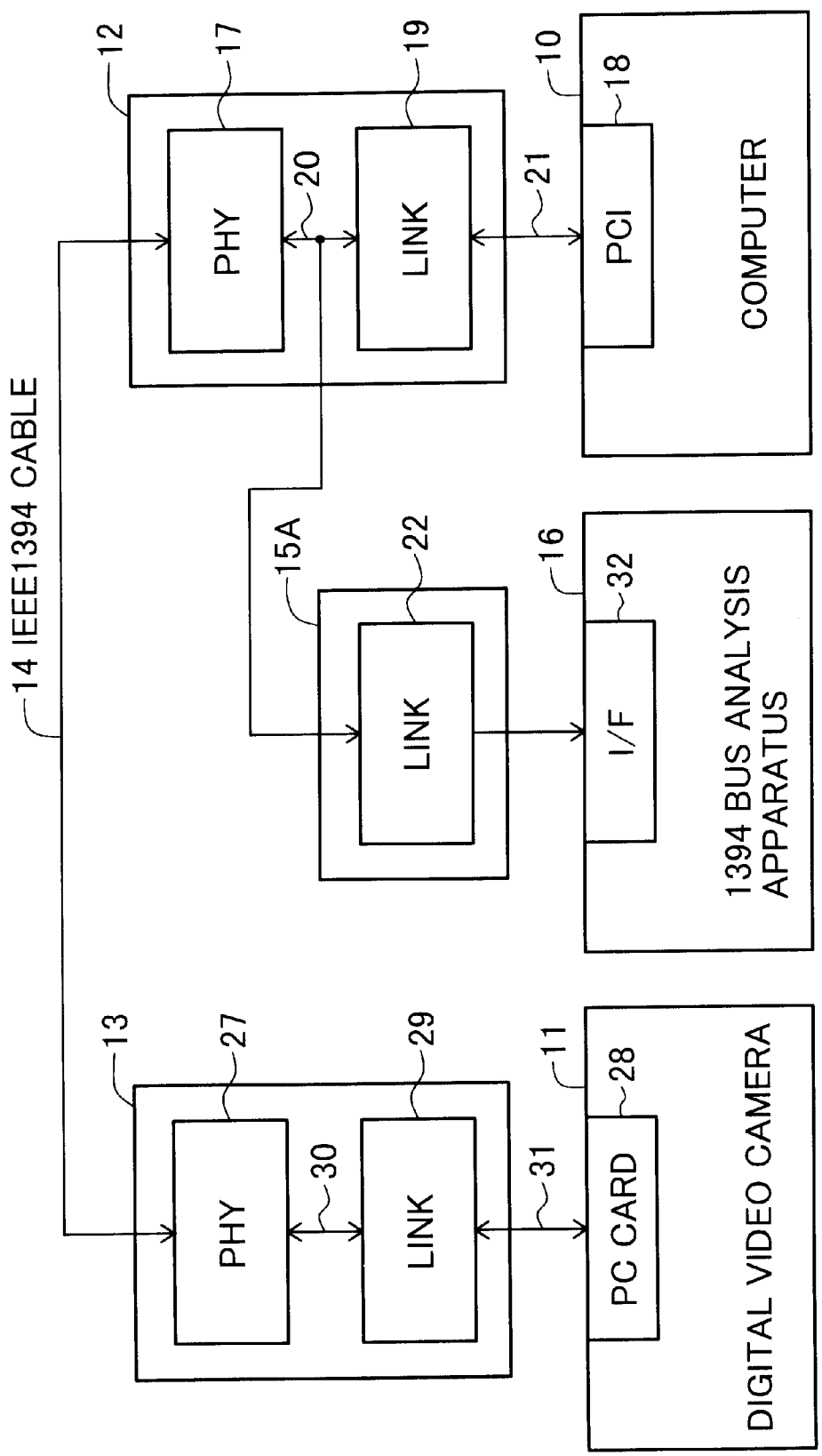
FIG. 1 is a block diagram showing a system for IEEE 1394 bus analysis, of the first embodiment according to the present invention.

Referring now to the drawings, wherein like reference characters designate like or corresponding parts throughout several views, preferred embodiments of the present invention are described below.

First Embodiment

FIG. 1 shows a system for IEEE 1394 bus analysis, of the first embodiment according to the present invention.

Figure 8:
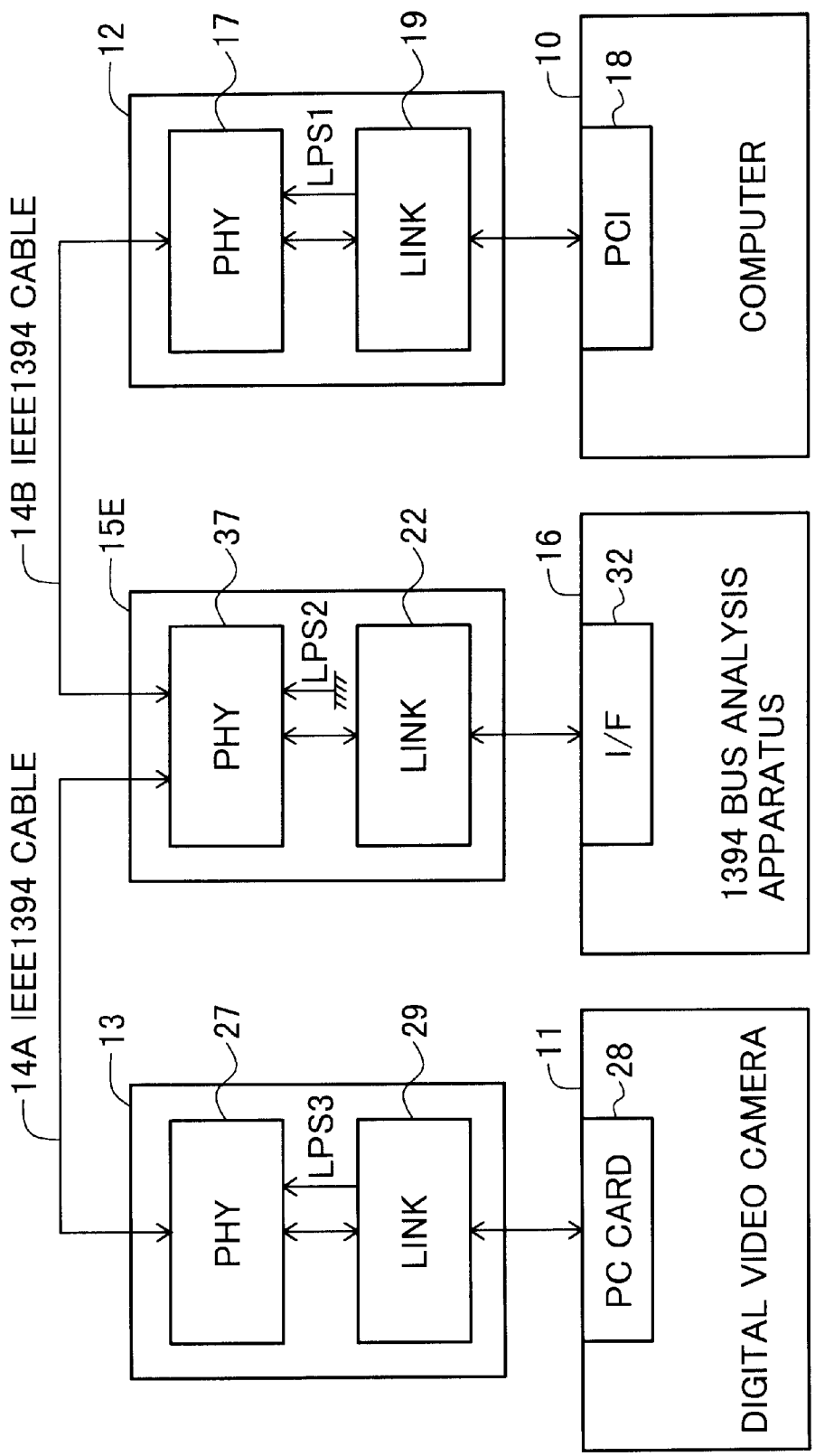
FIG. 8 is a block diagram showing a system for IEEE 1394 bus analysis, of the fifth embodiment according to the present invention.

Similar to FIG. 8, an IEEE 1394 serial bus 14 is connected between a computer 10 and a digital video camera 11 through 1394 bus interface circuits (nodes) 12 and 13, respectively. A console not shown is connected to the computer 10, the camera 11 and a 1394 bus analysis apparatus 16. The apparatus 16 is, for example, a computer.

The 1394 cable 14 has 4 or 6 electrical lines. In the case of 4 lines, it has a TPA cable pair for data signal transmission and a TPB cable pair for strobe signal transmission, while in the case of 6 lines, it further has a power supply bus line with, for example, 12 V and a ground line.

The interface circuit 12 is constructed of a physical layer circuit 17 to which one end of the 1394 cable 14 is connected and a link layer circuit 19 interfacing with both the physical layer circuit 17 and a PCI bus interface circuit 18 of the computer 10. The physical layer circuit 17 and the link layer circuit 19 are connected by electrical lines 20 and the link layer circuit 19, and the computer 10 are connected by electrical lines 21.

Likewise, the interface circuit 13 is constructed of a physical layer circuit 27 to which the other end of the 1394 cable 14 is connected and a link layer circuit 29 interfacing with both the physical layer circuit 27 and a PC card 28 of the camera 11. The physical layer circuit 27 and the link layer circuit 29 are connected by electrical lines 30, and the link layer circuit 29 and the camera 11 is connected by electrical lines 31.

The link layer circuits 19 and 29 are configured in different ways according to respective configurations of the PCI bus interface circuit 18 and the PC card 28. In order to capture and analyze data on the bus in development of the interface circuit 13, the lines 20 of the interface circuit 12 are connected to an interface circuit 32 of a 1394 bus analysis apparatus 16, for example a PCI bus interface circuit, through a 1394 bus analysis interface circuit 15A. The interface circuit 15A is a link layer circuit 22 for receiving signals on the lines 20, transmitted or received between the physical layer circuit 17 and the link layer circuit 19, and for converting the signals into data conforming to the standard of the interface circuit 32. Data received at the interface circuit 32 is stored into a memory within the 1394 bus analysis apparatus 16 to be analyzed by a MPU according to a bus analysis program.

With such a construction, events on the 1394 bus 14 in the same system as that used actually can be analyzed since the interface circuit 15A does not act as a node.

It should be noted that a combination of the physical layer circuit 17 and the link circuit 19 may be either separated LSIs or one integrated LSI. In the later case, part of output terminals of the LSI is connected to the link layer circuit 22.

Second Embodiment

In the system of FIG. 1, there is a need of means for fetching signals on the lines 20 from the 1394 bus interface circuit 12, and this means is used only in a development phase and therefore, it is better not to employ such means.

Figure 2:
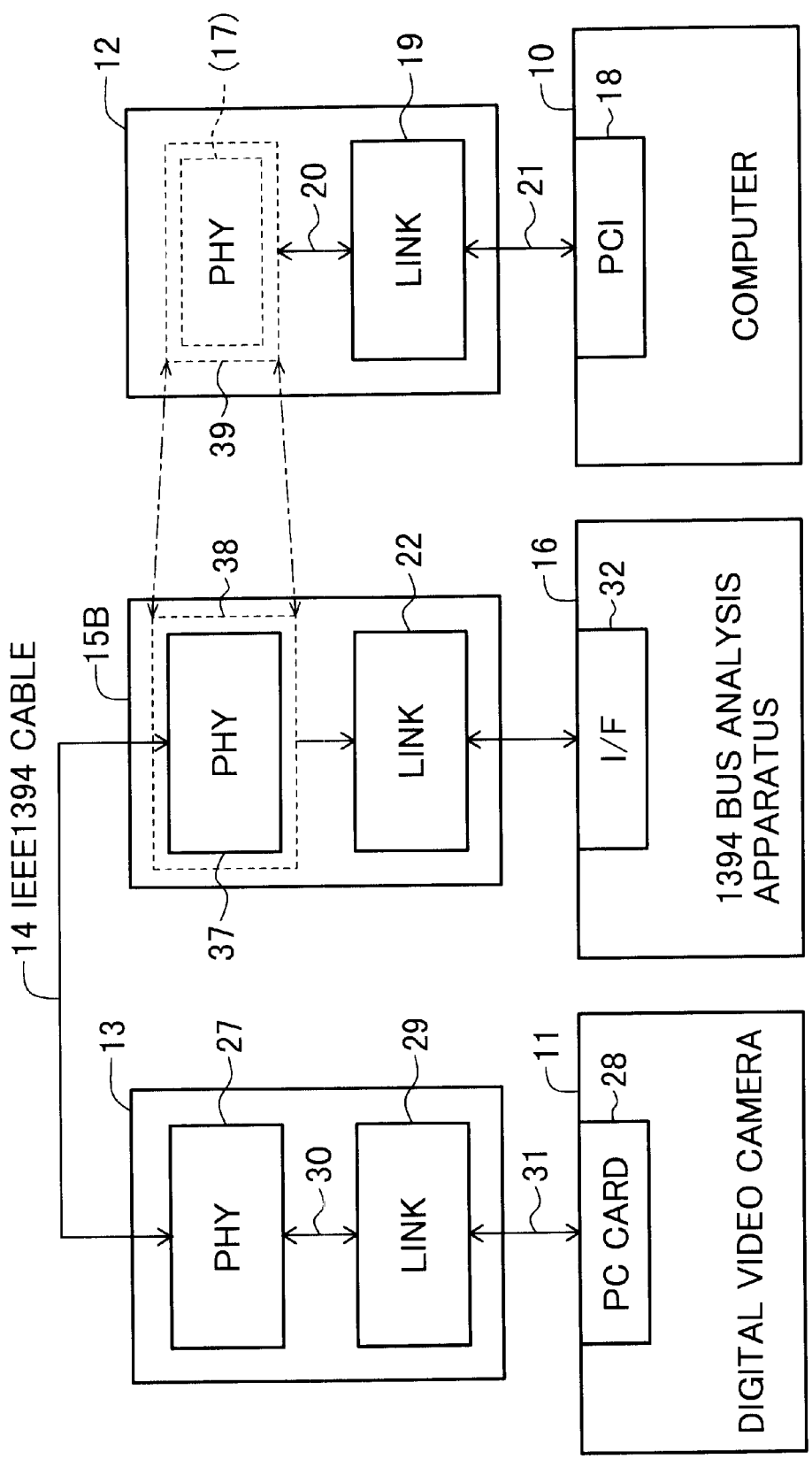
FIG. 2 is a block diagram showing a system for IEEE 1394 bus analysis, of the second embodiment according to the present invention.

FIG. 2 shows a system for IEEE 1394 bus analysis, of the second embodiment according to the present invention.

In the system, in order to make the signal fetch means unnecessary, a 1394 bus analysis interface circuit 15B is provided with the link circuit 22, a physical layer circuit 37 connected between the 1394 cable 14 and the link circuit 22, and a coupler 38 for connecting the circuit 37 to a link layer circuit 19 through a coupler 39. The coupler 38 is engaged with the coupler 39 from which a physical layer circuit 17 have been removed in order to connect the circuit 37 to the link layer circuit 19. With this coupling, the physical layer circuit 37 functions as the physical layer 17 of the interface circuit 12 and thereby, the interface circuit 12 behaves in the same way as FIG. 1. That is, the physical layer circuit 37 includes at least a circuit of the same function as the physical layer circuit 17. The physical layer circuit 37 may be either the same circuit as the physical layer circuit 17 or a circuit having the same circuit as the circuit 17 and an additional circuit for the link layer circuit 22. The link layer circuit 22 receives either the same signals as that on the lines 20 or signals obtained by processing the signals on the lines 20 in the additional circuit.

Since according to the second embodiment as well, the 1394 bus analysis interface circuit 15B does not act as an additional node for a 1394 bus analysis apparatus, an analysis can be carried on events on an IEEE 1394 bus in the same system as that used actually.

Third Embodiment

Figure 3:
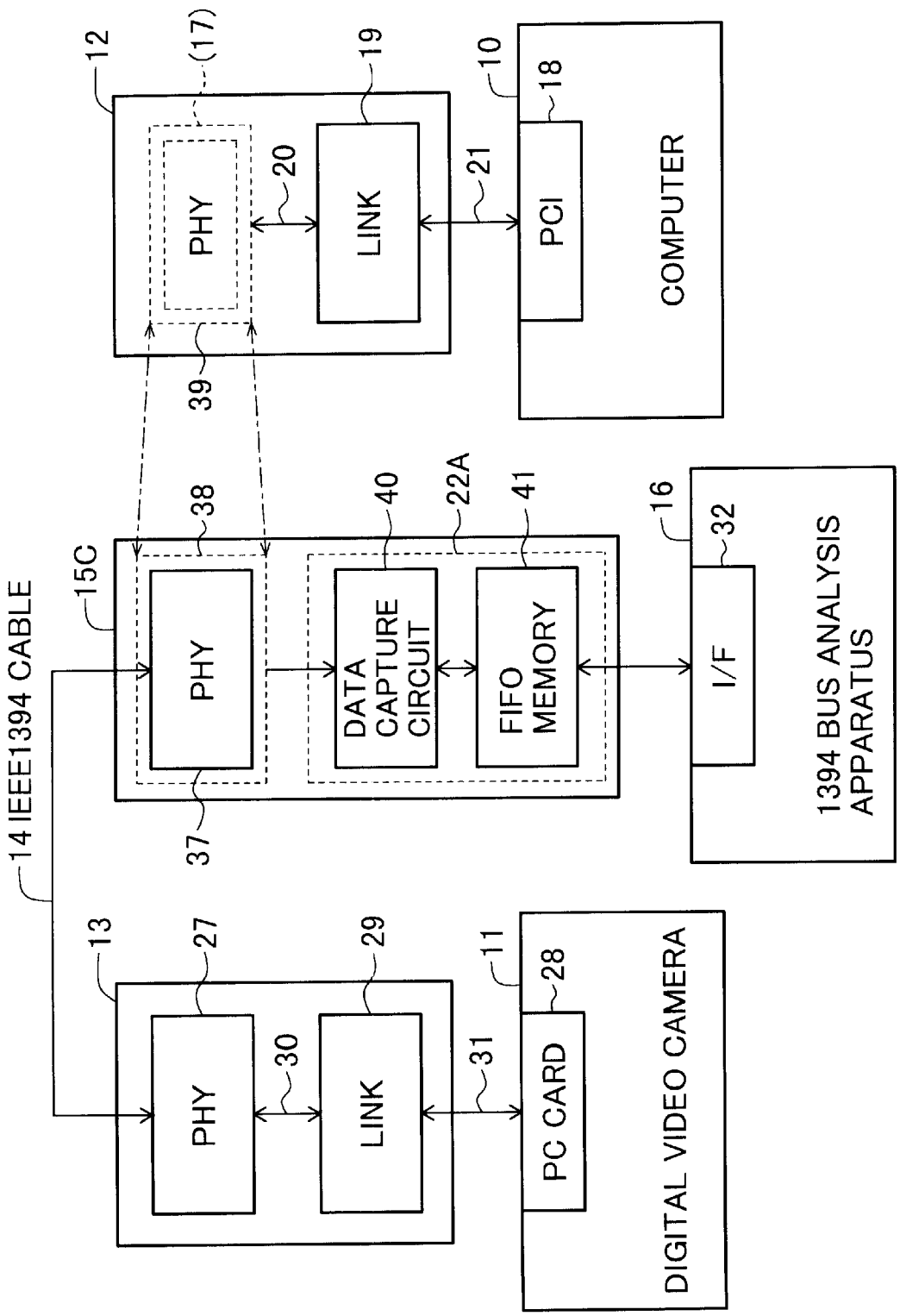
FIG. 3 is a block diagram showing a system for IEEE 1394 bus analysis, of the third embodiment according to the present invention.

FIG. 3 shows a system for IEEE 1394 bus analysis, of the third embodiment according to the present invention.

Data capture circuit 22A of a 1394 bus analysis interface circuit 15C includes a data capture circuit 40 and a FIFO memory 41. The data capture circuit 40 captures data of a predetermined kind among data included in the signals on the lines 20 and the captured data is written into the FIFO memory 41. The written data is further stored into a memory within the 1394 bus analysis apparatus 16 through the interface circuit 32.

Data indicating kinds of data to be captured by the data capture circuit 40 are written into the FIFO memory 41 by the 1394 bus analysis apparatus 16 prior to a test and the data capture circuit 40 reads out the data to determine the kind of data to be captured.

The other constituents of the configuration are the same as the second embodiment.

Fourth Embodiment

Figure 4:
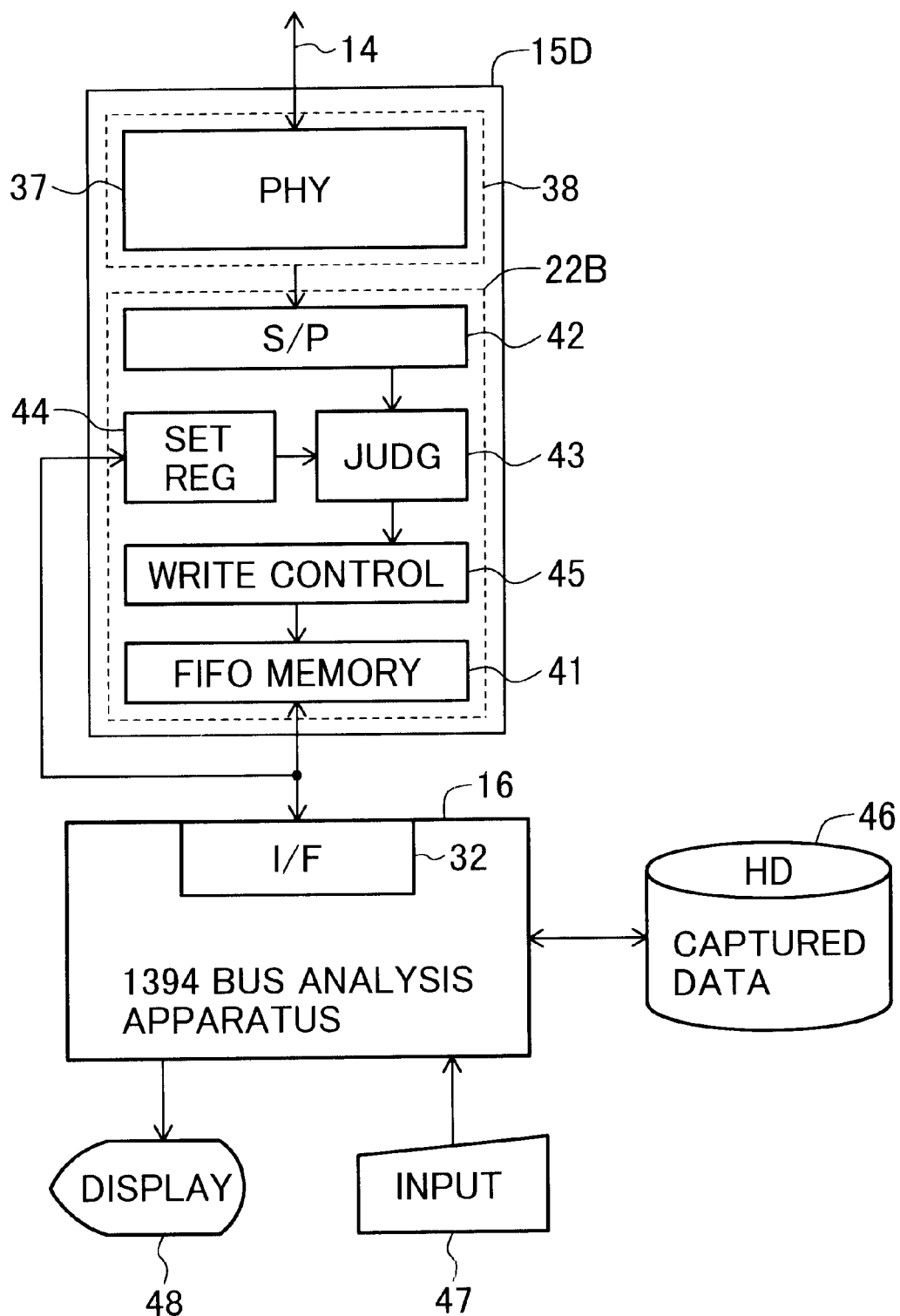
FIG. 4 is a block diagram showing an apparatus for IEEE 1394 bus analysis, of the fourth embodiment according to the present invention.

FIG. 4 shows an apparatus for IEEE 1394 bus analysis, of the fourth embodiment according to the present invention.

This apparatus is adopted instead of the apparatuses 15C and 16 of FIG. 3.

The data capture circuit 22B of a 1394 bus interface circuit 15D includes constituents 41 to 45. A hard disk device 46 is connected to the 1394 bus analysis apparatus 16, and an input device 47 and a display device 48 are further connected thereto as a console.

A serial/parallel converter 42 receives signals on the lines 20 of FIG. 3 through the coupler 38 and converts a serial data signal into a parallel data signal. Since the data is of DS (data strobe) coding, a judgment circuit 43 decodes the data and judges whether or not the data is to be captured with reference to data in a setting register file 44. Setting in the setting register file 44 is carried out prior to a test by the 1394 bus analysis apparatus 16 through an interface circuit 32 based on an operation of the input device 47. A write control circuit 45 writes the decoded data into the FIFO memory 41 when an affirmative judgment is made in the judgment circuit 43.

The 1394 bus analysis apparatus 16 reads data from the FIFO memory 41 through the interface circuit 32 and stores the data into an internal memory, and thereafter, further stores the data into the hard disk device 46. The 1394 bus analysis apparatus 16 analyzes data stored in the internal memory or the hard disk device 46 and makes a result displayed on the display device 48.

Figure 5:
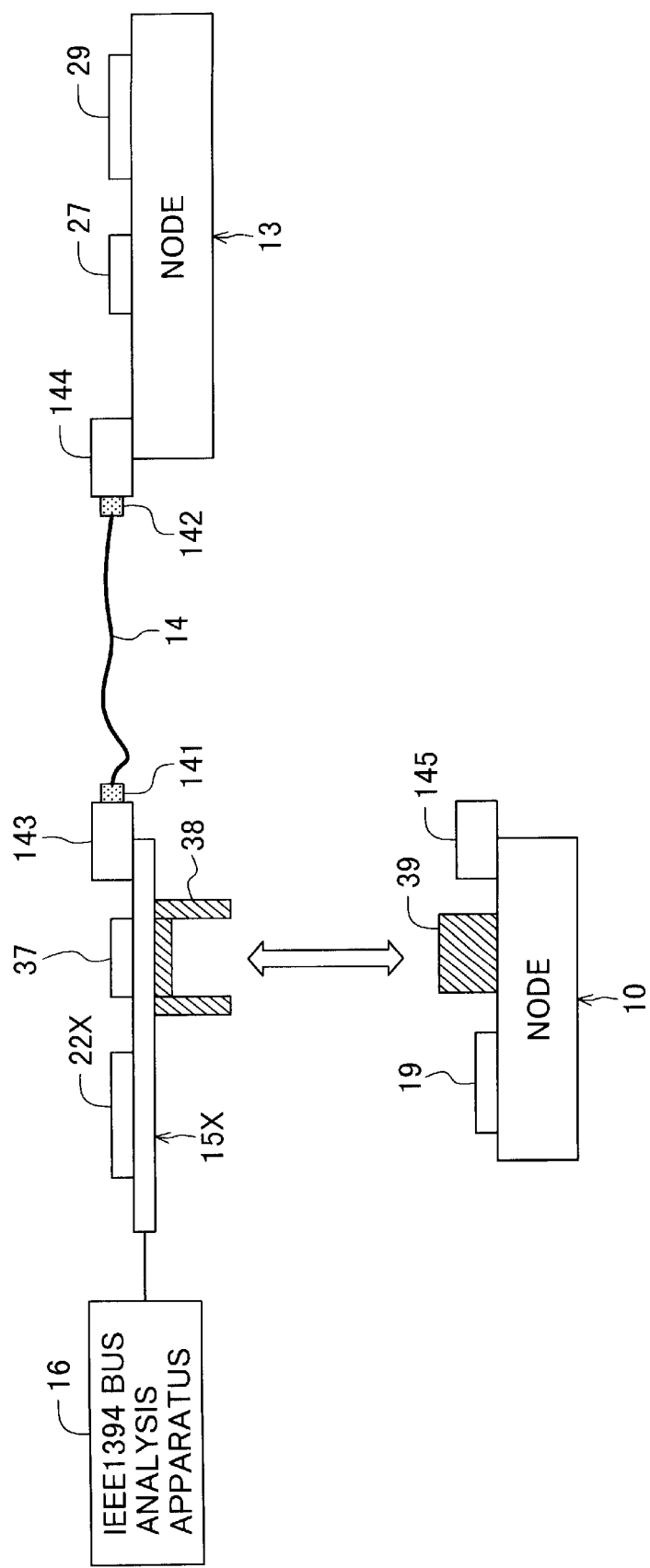
FIG. 5 is a schematic illustration showing an appearance of a system for IEEE 1394 bus analysis, of any of the second to fourth embodiments.
Figure 6:
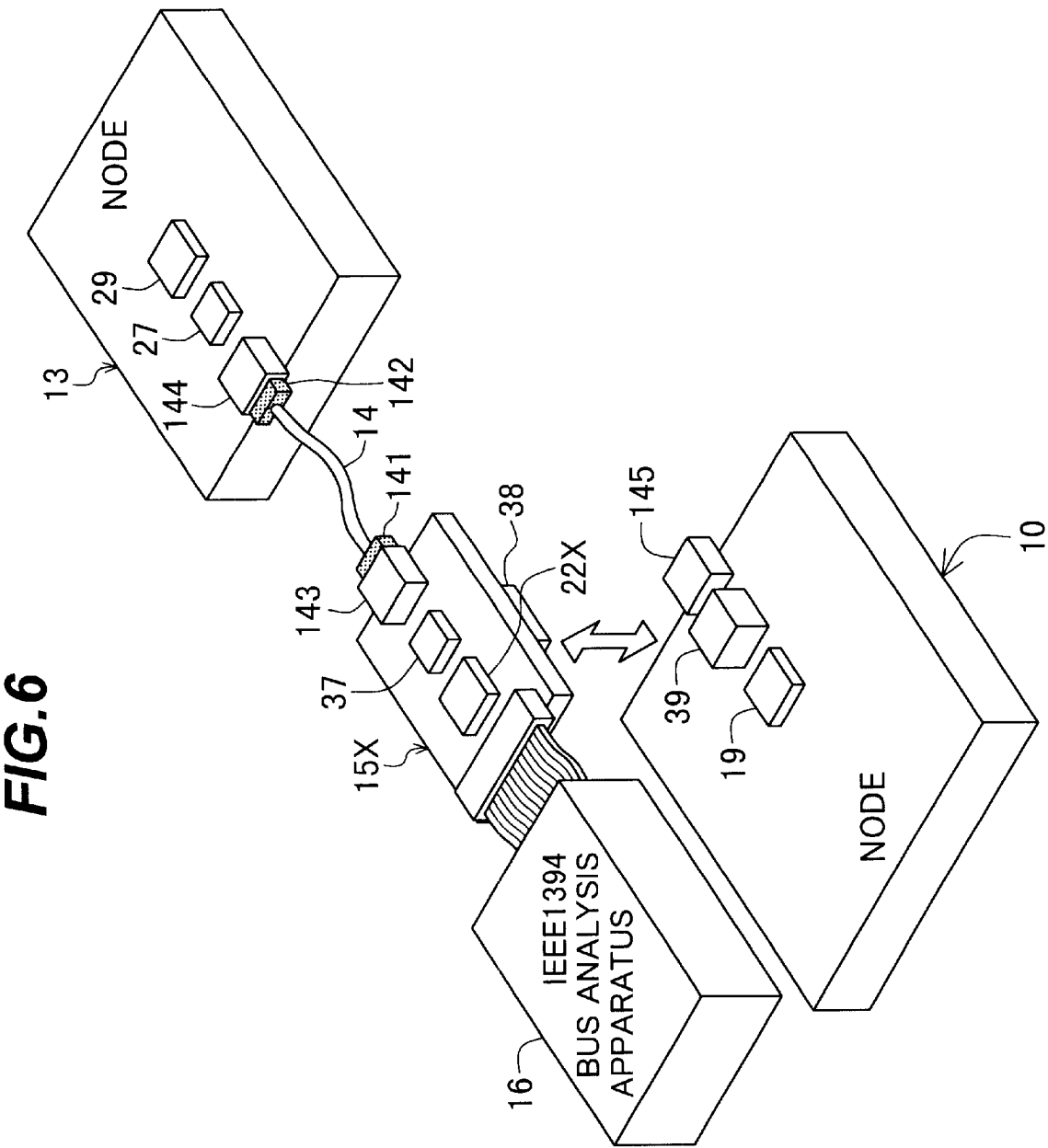
FIG. 6 is a schematic perspective view of the system for IEEE 1394 bus analysis of FIG. 5.
Figure 7:
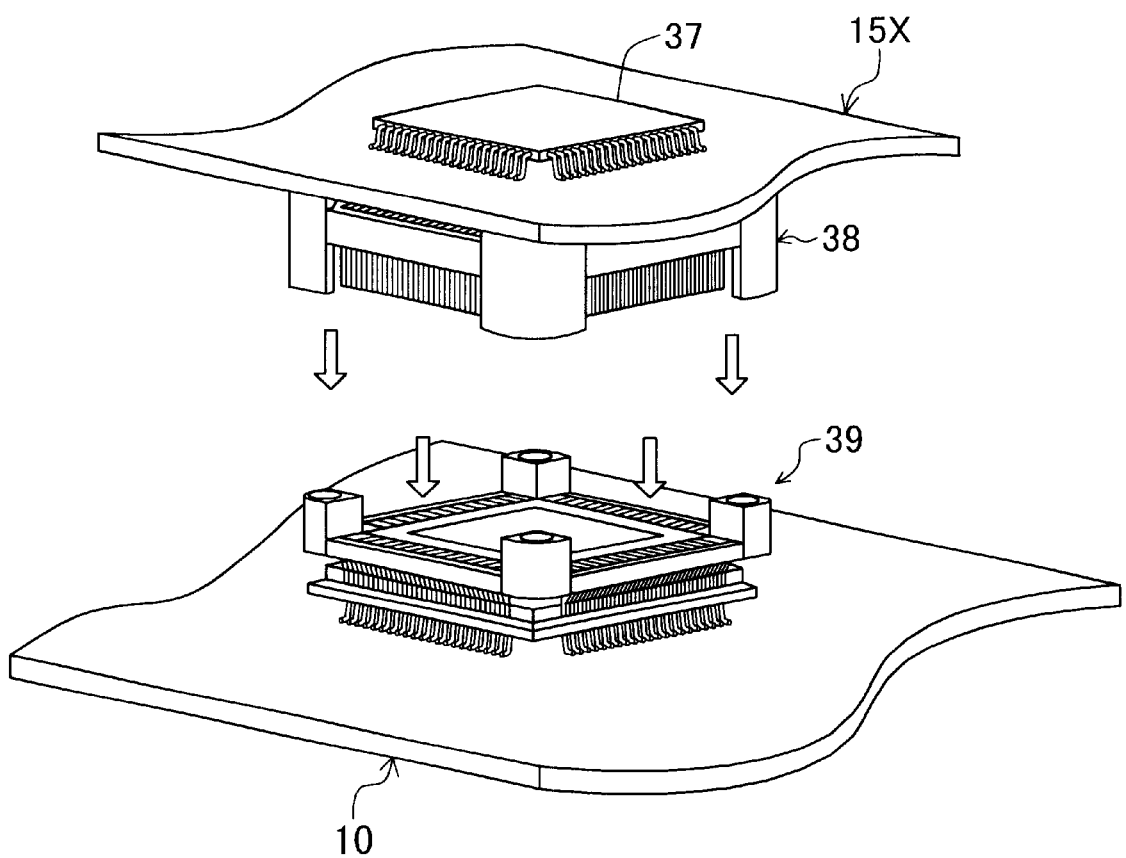
FIG. 7 is a perspective view showing a more detailed coupler pair of FIG. 6, mounted on substrates.

FIG. 5 shows a schematic appearance of a system for IEEE 1394 bus analysis, of any of the second to fourth embodiments. FIG. 6 is a perspective view of FIG. 5, and FIG. 7 shows, in a more detailed manner, a coupler pair mounted on substrates, of FIG. 6.

A reference character 22X indicates the link layer circuit 22 of FIG. 2, the data capture circuit 22A of FIG. 3 or the data capture circuit 22B of FIG. 4. A reference character 15X indicates the interface circuit 15B of FIG. 2, the interface circuit 15C of FIG. 3 or the interface circuit 15D of FIG. 4.

Connectors 141 and 142 are fixed to respective ends of the 1394 cable 14. The connector 141 is engaged with a connector 143 mounted fixedly on a board of the interface circuit 15X, and the connector 142 is engaged with a connector 144 mounted fixedly on a board of the interface circuit 13. A coupler 38 is fixed on the rear surface of the board of the interface circuit 15X corresponding to a physical layer LSI 37 mounted on the front surface of the board of the interface circuit 15X. When the couplers 38 and 39 are engaged with each other, the physical layer LSI 37 is electrically connected to the link layer LSI 19 through the couplers 38 and 39.

In an actual use, the connector 141 is engaged with a connector 145 mounted fixedly on a board of a computer 10 after the coupler 38 has been disengaged from the coupler 39.

The couplers 38 and 39 themselves of FIG. 7 are well known in the art. The couplers 38 and 39 are fastened with screws not shown after their engagement. The couplers 38 and 39 are in a relation of a socket and a plug, and further the coupler 39 serves as a socket for the physical layer LSI 17.

It should be noted that an LSI in which the physical layer circuit 17 and the link layer circuit 19 may be integrated into one body.

Fifth Embodiment

FIG. 8 shows a system for IEEE 1394 bus analysis, of the fifth embodiment according to the present invention.

Figure 14:
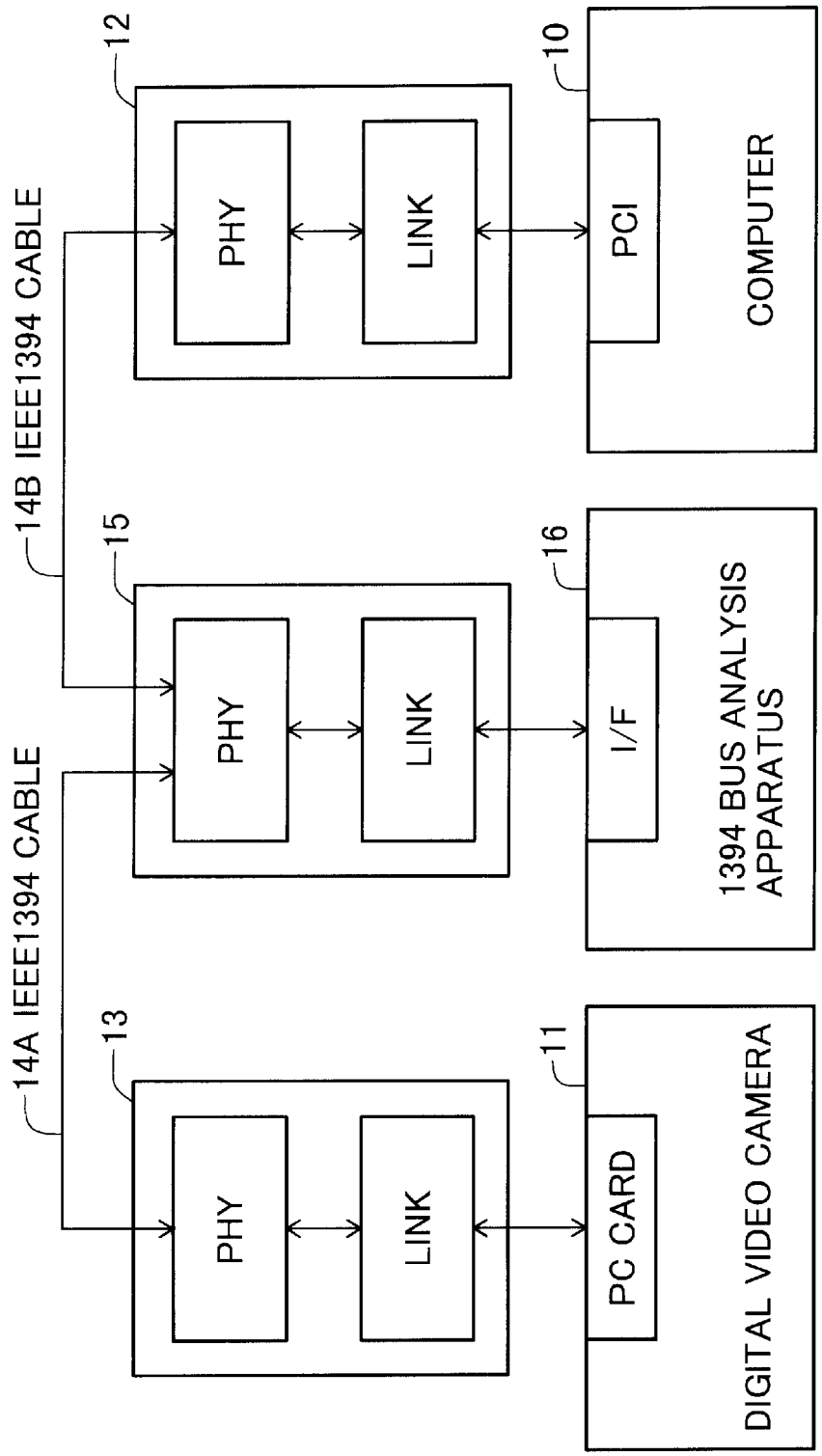
FIG. 14 is a block diagram showing a prior art system for IEEE 1394 bus analysis.

A 1394 bus analysis apparatus 16, similar to FIG. 14, is connected between the computer 10 and the camera 11 through the IEEE serial buses. That is, 1394 bus interface circuits 12, 15E and 13 are connected to the computer 10, the 1394 bus analysis apparatus 16 and the camera 11, respectively, and the 1394 cable 14A is connected between the interface circuits 13 and 15E, while the 1394 cable 14B is connected between the interface circuits 12 and 15E. A console not shown is connected to each of the 1394 bus analysis apparatus 16 and the camera 11.

The 1394 bus analysis interface circuit 15E is constructed of the physical layer circuit 37 and the link layer circuit 22.

Physical layer circuits and link layer circuits behave in conformity to the IEEE 1394 standard in a normal way. That is, the physical layer circuits 17, 37 and 27 convert serial data on the 1394 cables into parallel data, transmit and receive parallel data and control signals to and from the respective link layer circuits 19, 22 and 29, provide clocks to the respective link layer circuits 19, 22 and 29, convert parallel data from the respective link layer circuits 19, 22 and 29 into serial data, output serial data onto the 1394 cables, and output respective self ID packets onto the 1394 cables on a bus reset.

The link layer circuits 19, 22 and 29 packetize transmit data, transmit and receive packets, and judge whether or not self ID packets are being received. The link layer circuits 19, 22 and 29 are configured in different ways according to respective configurations of the interface circuits 18, 32 and 28.

Power is provided to the physical layer circuits 17, 37 and 27 from the 1394 bus, and to the link layer circuits 19, 22 and 29 from the apparatuses 10, 16 and 11, respectively.

In general, when power supply to a link layer circuit is off, an LPS (Link Power Status) signal provided from the link layer circuit to a physical layer circuit is low and in this situation, the physical layer circuit, on a bus reset, outputs a self ID packet including information of link-off (L='0') onto a 1394 bus. FIG. 9 shows the format of the self-ID packet and the packet includes a physical ID, a link-on L and other self-identification information. After the physical layer circuit has outputted the self-ID packet including L='0,' the circuit functions as a repeater to transfer data provided from one 1934 bus to the other 1394 bus.

In regard to the interface circuits 12 and 13, similar to the above description, link power status signals LPS1 and LPS3 are provided from the link layer circuits 19 and 29 to the physical layer circuits 17 and 27, respectively. Contrast to this, in regard to the interface circuit 15E, it is different from the above cases in that a link power status signal LPS2 provided to the physical layer circuit 37 is fixed low regardless of on/off of power supply to the link layer circuit 22. When the signal LPS2 is low, the physical layer circuit 37 provides received data to the link layer circuit 22, similar to the case of the signal LPS2 being high (the signal outputs of the circuit 37 are not in high impedance state).

Accordingly, on a bus reset in conformity to the IEEE 1394 standard, a self-ID packet including information of link-off (L='0') is outputted from the physical layer circuit 37 to a 1394 bus and the physical layer circuit 37 functions as a repeater. Even with link-off, power supply to the link layer circuit 22 can be on by turning on power supply to the 1394 bus analysis apparatus 16, received data of the physical layer circuit 37 is provided through the link layer circuit 22 to the 1394 bus analysis apparatus 16 and stored into a memory within the apparatus 16, and the received data is analyzed by an MPU of the apparatus 16 according to the bus analysis program.

That is, since the physical layer circuit functions as a repeater, an analysis can be carried out on events on an IEEE 1394 bus in the same system as that used actually.

Further, the 1394 bus analysis apparatus 16 and the interface circuit 15E can be applied to any system using an IEEE 1394 bus.

It should be noted that the physical layer circuit 37 and the link layer circuit 22 can be either separated LSIs or one LSI into which both are integrated. In the latter case, the LSI has an LPS signal input which is made fixedly low.

Sixth Embodiment

Figure 10:
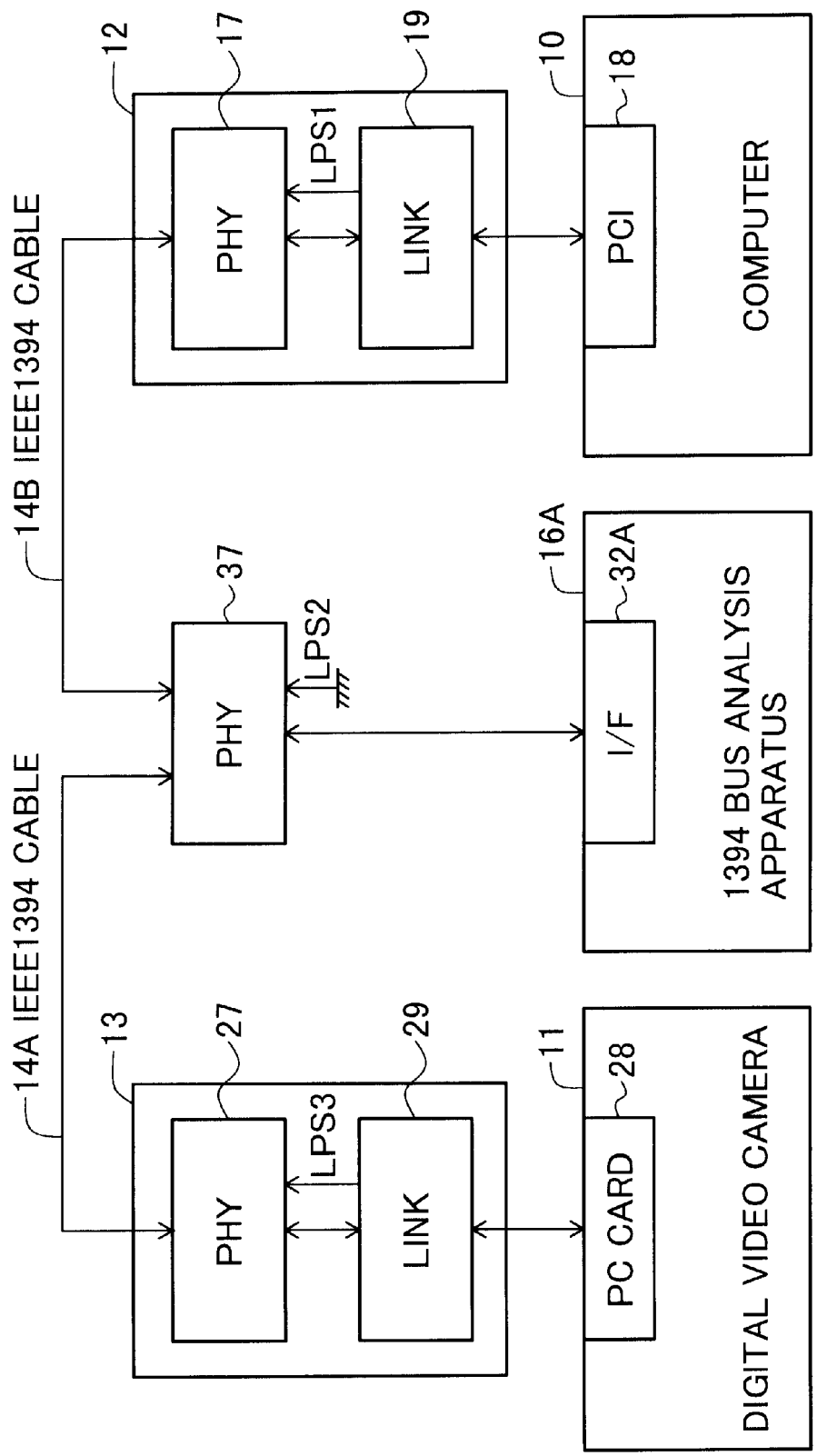
FIG. 10 is a block diagram showing a system for IEEE 1394 bus analysis, of the sixth embodiment according to the present invention.

FIG. 10 shows a system for IEEE 1394 bus analysis, of the sixth embodiment according to the present invention.

An interface circuit 32A of a 1394 bus analysis apparatus 16A exerts functions of the interface circuit 32 and the link layer circuit 22 of FIG. 8. The other constituents of the configuration are the same as the above-described fifth embodiment.

Seventh Embodiment

Figure 11:
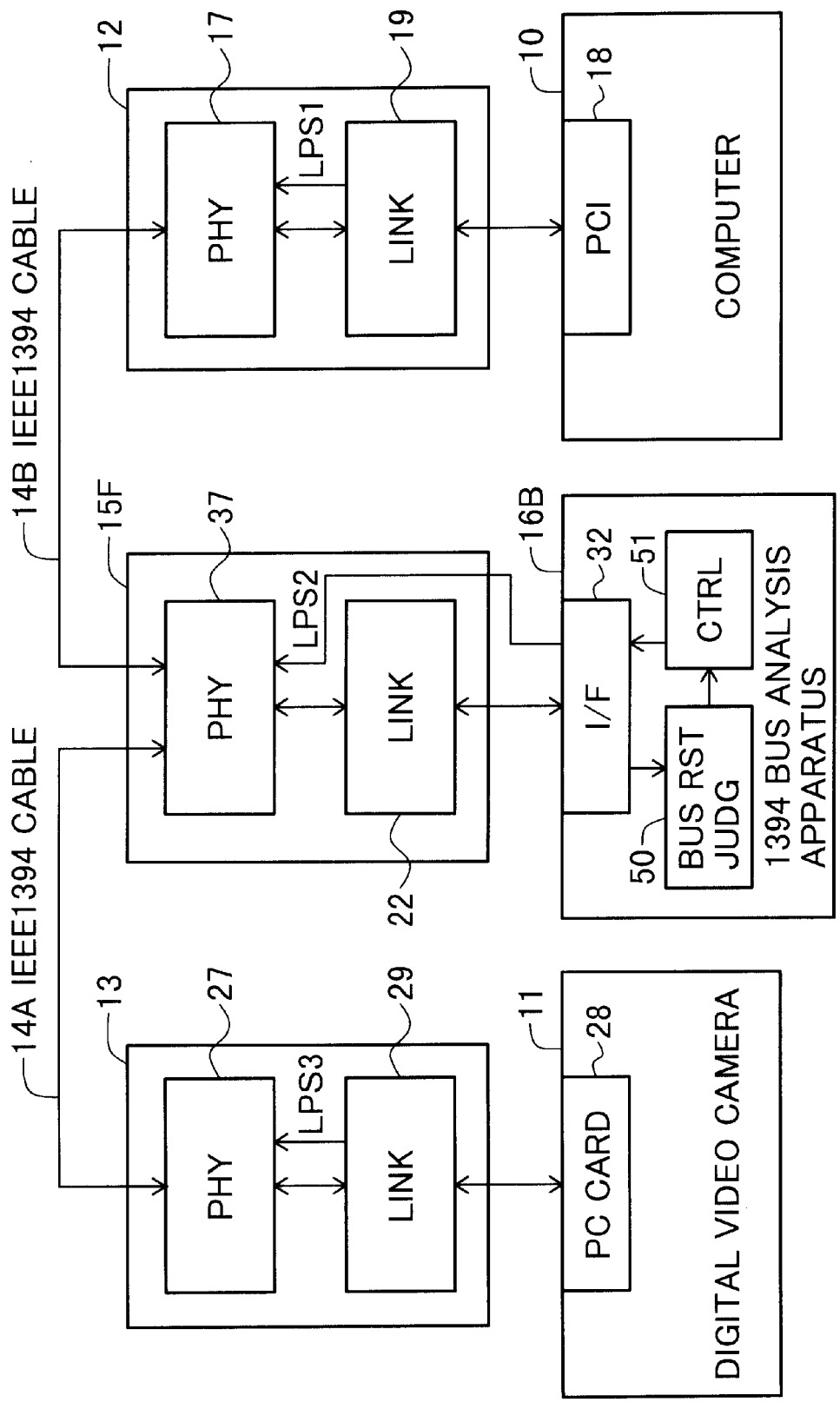
FIG. 11 is a block diagram showing a system for IEEE 1394 bus analysis, of the seventh embodiment according to the present invention.

FIG. 11 shows a system for IEEE 1394 bus analysis, of the seventh embodiment according to the present invention.

A 1394 bus analysis interface circuit 15F of this system is different from the interface circuit 15E of FIG. 8 in that an LPS2 signal provided to the physical layer circuit 37 is not fixedly set low but provided from the interface circuit 32.

A 1394 bus analysis apparatus 16B is different from the apparatus 16 of FIG. 8 in that the apparatus 16B includes a bus reset judgment section 50 and a control section 51 in order to control the level of the LPS2 signal. The bus reset judgment section 50 and the control section 51 may be configured in either hardware or software.

The bus reset judgment section 50 judges whether or not received data provided from the link layer circuit 22 through the interface circuit 32 indicates a bus reset. When the received data is judged to be a bus reset, the control section 51 sets low the LPS2 signal and outputs it through the interface circuit 32. With the LPD2 at low, the physical layer circuit 37 functions as a repeater, and bus analysis can be performed in the 1394 bus analysis apparatus 16B.

At a predetermined timing after the physical layer circuit 37 has transmitted a self ID packet, or when such a time has elapsed that transmission of the self ID packet is estimated to be complete, the control section 51 sets high the LPS2 signal and outputs it through the 1394 bus analysis apparatus 16B.

According to the seventh embodiment, since the level of the LPS2 signal can be controlled regardless of on/of of power supply provided to the link layer circuit 22, the 1394 bus analysis apparatus 16B can perform bus analysis or can be used for other purposes in a state where the physical layer circuit 37 is not a repeater, according to the circumstances.

Eighth Embodiment

Figure 12:
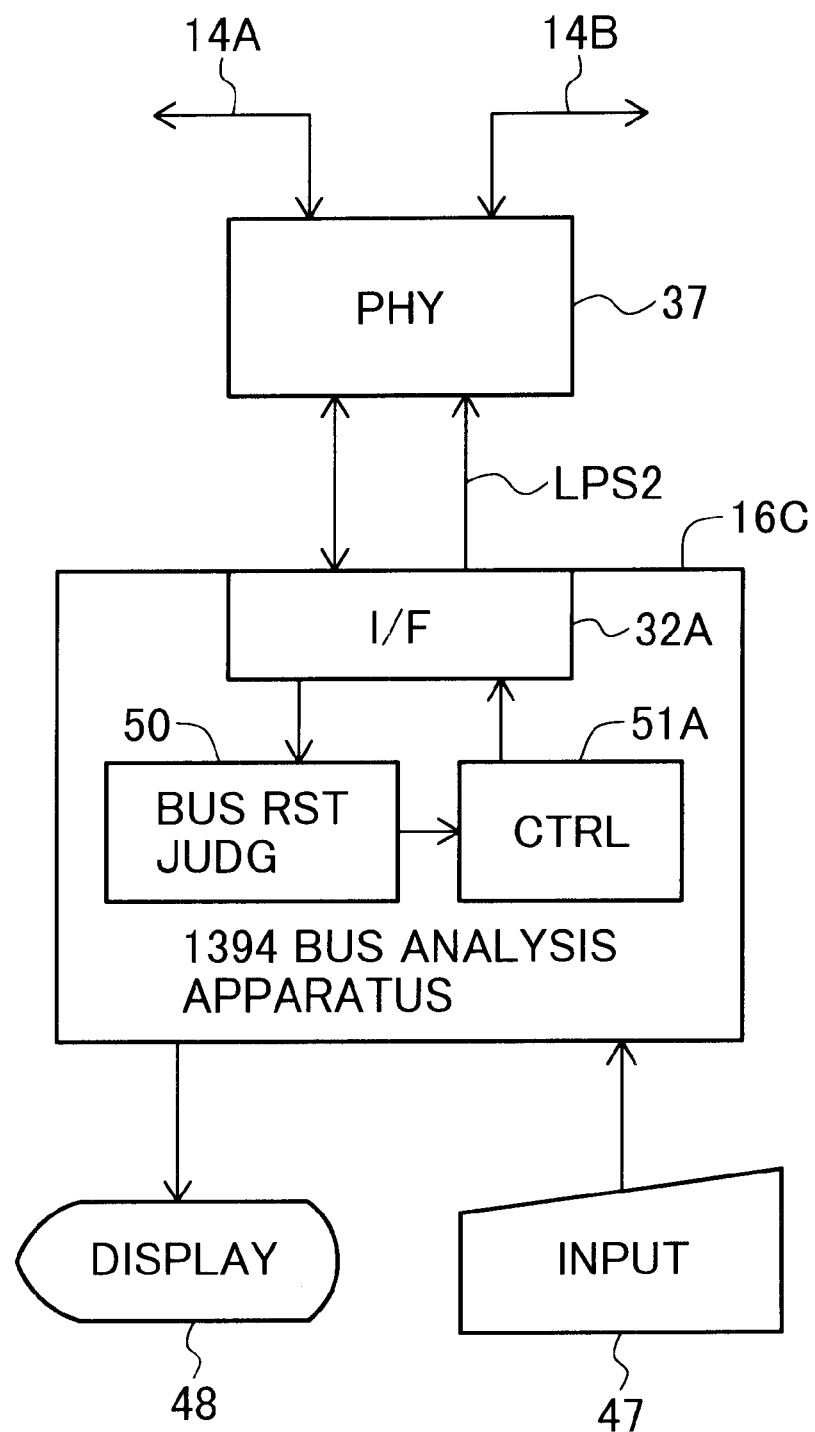
FIG. 12 is a block diagram showing a system for IEEE 1394 bus analysis, of an eighth embodiment according to the present invention.
Figure 13:
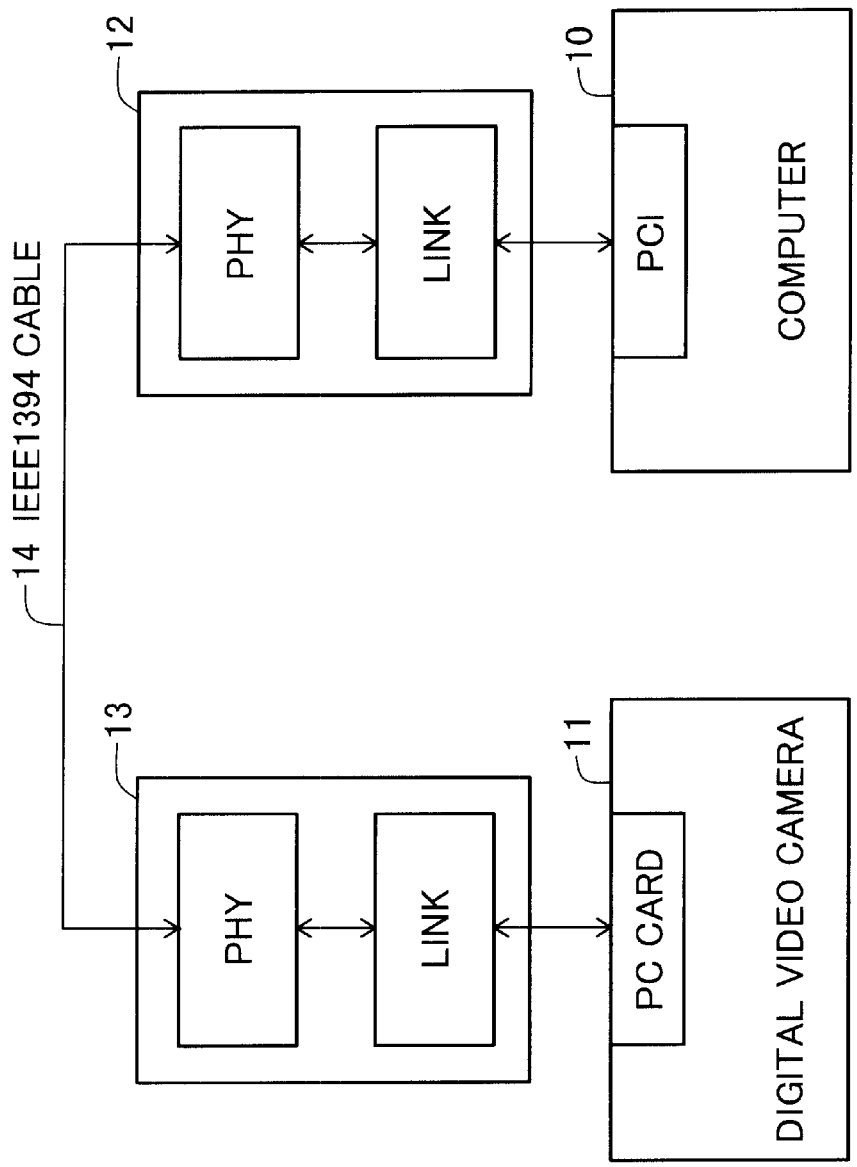
FIG. 13 is a block diagram showing a prior art system having an IEEE 1394 bus.

FIG. 12 shows a system for IEEE 1394 bus analysis, of the eighth embodiment according to the present invention.

An input device 47 and a display device 48 are connected to a 1394 bus analysis apparatus 16C. The 1394 bus analysis apparatus 16C includes the interface circuit 32A of FIG. 10, and the bus reset judgment section 50 and a control section 51A, similar to FIG. 11. The control section 51A sets the LPS2 signal high or low through an interface circuit 32A in response to operation of the input device. The control section 51A may automatically set the LPS2 signal low as in the seventh embodiment and may set the LPS2 signal high in response to operation of the input device 47.

Although preferred embodiments of the present invention has been described, it is to be understood that the invention is not limited thereto and that various changes and modifications may be made without departing from the spirit and scope of the invention.

What is claimed is:

1. An IEEE 1394 bus analysis method comprising the steps of:
   preparing an IEEE 1394 bus interface circuit which includes a physical layer circuit connected to an IEEE 1394 bus; a link layer circuit connected to said physical layer through signal lines and an analysis interface circuit connected to said physical layer through said signal line;
   inputting data from said signal lines to the analysis interface circuit;
   storing the inputting data into the analysis interface circuit; and
   analyzing the stored data.

2. An IEEE 1394 bus analysis interface circuit comprising:
   a physical layer circuit, connected to an IEEE 1394 bus;
   a data capture circuit, connected to said physical layer circuit through signal lines, capturing data on said signal lines for data analysis; and
   a coupler, connected to said physical layer circuit, to be engaged to another coupler to which a physical layer circuit of another IEEE 1394 bus interface circuit is to be attached.

3. The interface circuit of claim 2, wherein said data capture circuit is a link layer circuit.

4. The interface circuit of claim 2, wherein said data capture circuit comprises:
   a memory; and
   a control circuit, capturing data on said signal lines to store into said memory.

5. The interface circuit of claim 4, wherein said control circuit comprises:
   a storage section in which a kind of data to be captured is set;
   a judgment section, judging whether or not a kind of data on said signal lines coincides with said kind of data in said storage section; and
   a write circuit, storing said data on said signal lines into said memory when the coincidence has judged.

6. An IEEE 1394 bus analysis interface circuit comprising:
   a physical layer circuit, connected to an IEEE 1394 bus, having a link power status signal input, said link power status signal input being fixed inactive to function as a repeater; and
   a data capture circuit, connected to said physical layer circuit through signal lines, capturing data on said signal lines for data analysis.

7. The interface circuit of claim 6, wherein said data capture circuit is a link layer circuit.

8. An IEEE 1394 bus analysis apparatus comprising:
   a physical layer circuit, connected to an IEEE 1394 bus, having a link power status signal input, functioning as a repeater when said link power status signal input is inactive;
   a data capture circuit, connected to said physical layer circuit through signal lines, capturing data on said signal lines for data analysis; and
   a control section, setting said link power status signal inactive when the captured data indicates a bus reset.

9. The apparatus of claim 8, wherein said control circuit sets said link power status signal active or inactive in response to a control signal provided externally.

10. An IEEE 1394 bus analysis apparatus comprising:
    a physical layer circuit, connected to an IEEE 1394 bus, having a link power status signal input, functioning as a repeater when said link power status signal input is inactive;
    a data capture circuit, connected to said physical layer circuit through signal lines, capturing data on said signal lines for data analysis; and
    a control circuit, setting said link power status signal active or inactive in response to a control signal provided externally.

11. An IEEE 1394 bus analysis method comprising the steps of:
    preparing a physical layer circuit which has a link power status signal input,
    connecting a physical layer circuit to an IEEE 1394 bus;
    providing an inactive signal to said link power status signal input to make said physical layer circuit function as a repeater;
    capturing data which said physical layer circuit has received; and
    analyzing the captured data.

12. A serial bus analysis method comprising the steps of:
    preparing a serial bus interface circuit which includes a physical layer circuit connected to a serial bus; a link layer circuit connected to said physical layer through signal lines and an analysis interface circuit connected to said physical layer through said signal line;

inputting data from said signal lines to the analysis interface circuit;

storing the inputting data into the analysis interface circuit; and analyzing the stored data.

* * * * *